US011089637B2

(12) United States Patent
Fan et al.

(10) Patent No.: US 11,089,637 B2
(45) Date of Patent: Aug. 10, 2021

(54) COMMUNICATION METHOD IN INTERNET OF THINGS ENVIRONMENT AND SYSTEM THEREOF (71) Applicant: Wistron NeWeb Corporation, Hsinchu (TW)

(72) Inventors: Jie Fan, Hsinchu (TW); Ko-Chin Wang, Hsinchu (TW); HongBo Cai, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 35 days.

(21) Appl. No.: 16/669,564

(22) Filed: Oct. 31, 2019

(65) Prior Publication Data

US 2020/0305205 A1 Sep. 24, 2020

(30) Foreign Application Priority Data

Mar. 22, 2019 (CN) .......................... 201910221533.5

(51) Int. Cl.
*H04W 76/10* (2018.01)
*H04W 72/08* (2009.01)
*H04W 52/02* (2009.01)
*H04W 72/04* (2009.01)
*H04W 84/18* (2009.01)

(52) U.S. Cl.
CPC ....... *H04W 76/10* (2018.02); *H04W 52/0235* (2013.01); *H04W 72/0453* (2013.01); *H04W 72/085* (2013.01); *H04W 84/18* (2013.01)

(58) Field of Classification Search
CPC ............. H04W 76/10; H04W 52/0235; H04W 72/0453; H04W 72/085; H04W 84/18

USPC ........................................................ 370/315
See application file for complete search history.

(56) References Cited

U.S. PATENT DOCUMENTS 8,102,761 B2   1/2012  Yamaguchi et al.
9,319,827 B2   4/2016  Liu et al.
9,674,880 B1*  6/2017  Egner .................. A61B 5/1451
(Continued)

FOREIGN PATENT DOCUMENTS

CN    102077680 A    5/2011
TW    201503752 A    1/2015
TW    201507538 A    2/2015

*Primary Examiner* — Mong-Thuy T Tran
(74) *Attorney, Agent, or Firm* — McClure, Qualey & Rodack, LLP (57) ABSTRACT A communication method in an Internet of Things environment is for transmitting an outgoing message to the Internet. The communication method includes a device status acquiring step, a switch process determining step and a message transmitting step. The device status acquiring step is performed to obtain a signal connecting status between a demand device and a first base station. The switch process determining step is performed to determine whether a switch process of the demand device is activated according to the signal connecting status. In response to determining that the switch process of the demand device is activated, establishing a first communication path to connect the demand device, a target device, a second base station, and the Internet. The message transmitting step is performed to transmit the outgoing message from the demand device to the Internet via one of the first communication path and the second communication path.

17 Claims, 6 Drawing Sheets (56) References Cited

U.S. PATENT DOCUMENTS

| | | | |
|---|---|---|---|
| 9,888,337 B1* | 2/2018 | Zalewski | H04L 67/10 |
| 2010/0142448 A1* | 6/2010 | Schlicht | H04W 28/021 |
| | | | 370/328 |
| 2011/0032818 A1* | 2/2011 | Yamaguchi | H04L 45/02 |
| | | | 370/225 |
| 2015/0009876 A1 | 1/2015 | Ye | |
| 2015/0045018 A1* | 2/2015 | Liu | H04W 76/14 |
| | | | 455/426.1 |
| 2017/0054482 A1* | 2/2017 | Forenza | H04B 7/10 |
| 2018/0116004 A1* | 4/2018 | Britt | H04L 69/14 |
| 2018/0183832 A1* | 6/2018 | Chang | H04W 4/38 |
| 2018/0279096 A1* | 9/2018 | Wu | G08G 1/22 |
| 2020/0154448 A1* | 5/2020 | Wilmunder | H04W 72/10 |
| 2020/0177671 A1* | 6/2020 | Tofighbakhsh | H04L 67/1002 |

* cited by examiner

COMMUNICATION METHOD IN INTERNET OF THINGS ENVIRONMENT AND SYSTEM THEREOF

RELATED APPLICATIONS

This application claims priority to China application No. 201910221533.5, filed on Mar. 22, 2019, which is herein incorporated by reference.

BACKGROUND

Technical Field

The present disclosure relates to a communication method and a system thereof. More particularly, the present disclosure relates to a communication method in an Internet of Things environment and a system thereof.

Description of Related Art

In general, a conventional Internet of Things (IoT) system mainly includes a LTE CAT M (Long Term Evolution Category M) technology and a LTE NB-IoT (Long Term Evolution Narrow Band-Internet of Things) technology. The LTE CAT M technology and the LTE NB-IoT technology configure a device connected directly to a base station for accessing an Internet. If communication or data transmission between devices is required, it needs to be accomplished by the base station. However, if signal quality of the base station is poor, the data will not be transmitted even if the devices are very close to each other.

In practical applications, the device sometimes needs to communicate with the base station for connecting to the Internet and sometimes needs to connect to other devices for communication. It is common practice to connect the device to the base station by using a wireless wide area network (WWAN) system, and then connect the device to the other devices by using another local area network (LAN) system. However, such an approach not only results in higher cost, but also is not capable of reducing power consumption. Therefore, a communication method in an Internet of Things environment and a system thereof which are capable of being low cost, saving power consumption and effectively accomplishing the connection between the devices are commercially desirable.

SUMMARY

According to one aspect of the present disclosure, a communication method in an Internet of Things environment is for transmitting an outgoing message to the Internet. The communication method includes a device status acquiring step, a switch process determining step and a message transmitting step. The device status acquiring step is performed to obtain a signal connecting status between a demand device and a first base station. The outgoing message is stored in the demand device. The switch process determining step is performed to determine whether a switch process of the demand device is activated according to the signal connecting status. In response to determining that the switch process of the demand device is activated, establishing a first communication path to connect the demand device, a target device, a second base station, and the Internet. In response to determining that the switch process of the demand device is not activated, establishing a second communication path to connect the demand device, the first base station, and the Internet. The message transmitting step is performed to transmit the outgoing message from the demand device to the Internet via one of the first communication path and the second communication path.

According to another aspect of the present disclosure, a communication method in an Internet of Things environment is for transmitting an outgoing message to the Internet. The communication method includes a device status acquiring step, a switch process determining step and a message transmitting step. The device status acquiring step is performed to obtain a user demand condition inputted from a user terminal to a demand device. The outgoing message is stored in the demand device. The switch process determining step is performed to determine whether a switch process of the demand device is activated according to the user demand condition. In response to determining that the switch process of the demand device is activated, establishing a first communication path to connect the demand device, a target device, a second base station and the Internet. In response to determining that the switch process of the demand device is not activated, establishing a second communication path to connect the demand device, a first base station and the Internet. The message transmitting step is performed to transmit the outgoing message from the demand device to the Internet via one of the first communication path and the second communication path.

According to further another aspect of the present disclosure, a communication system in an Internet of Things environment is configured to transmit an outgoing message to the Internet. The communication system includes a target device and a demand device. The demand device is signally connected to the target device. The outgoing message is stored in the demand device. The demand device includes an antenna, an antenna switching circuit and a control processor. The antenna switching circuit is electrically connected to the antenna. The control processor is electrically connected to the antenna switching circuit. The control processor is configured to determine whether a switch process of the demand device is activated according to a signal connecting status or a user demand condition. In response to determining that the switch process of the demand device is activated, a first communication path is established to connect the demand device, the target device, a second base station, and the Internet. In response to determining that the switch process of the demand device is not activated, a second communication path is established to connect the demand device, a first base station, and the Internet. The outgoing message is transmitted from the demand device to the Internet via one of the first communication path and the second communication path.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
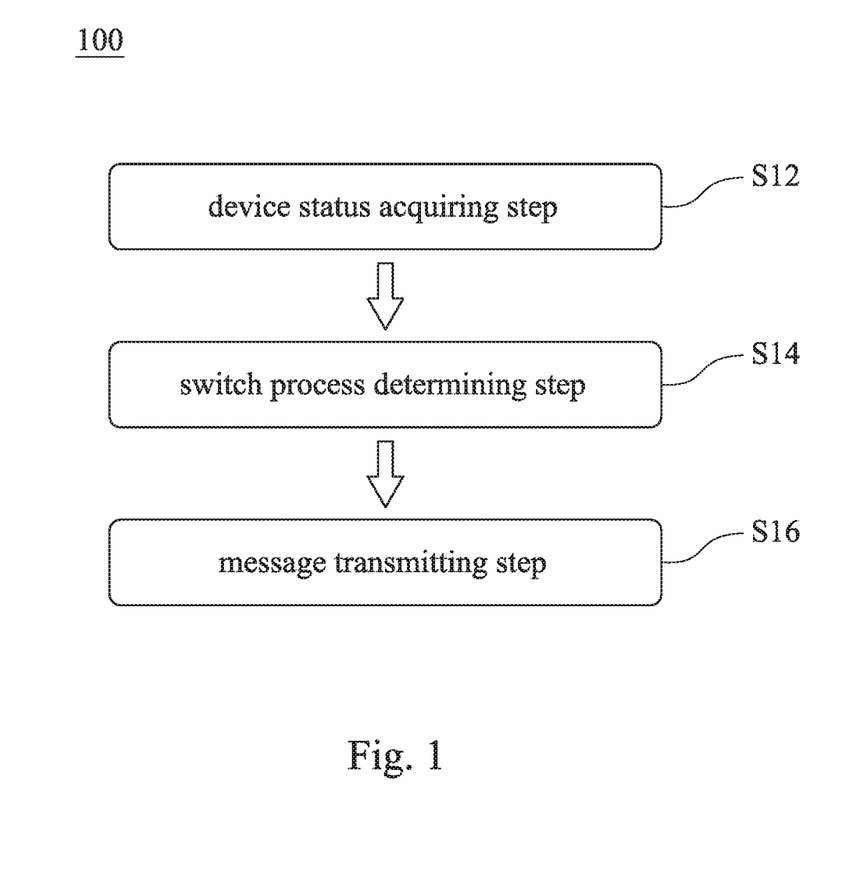
FIG. 1 shows a flow chart of a communication method in an Internet of Things environment according to one embodiment of the present disclosure.
Figure 2:
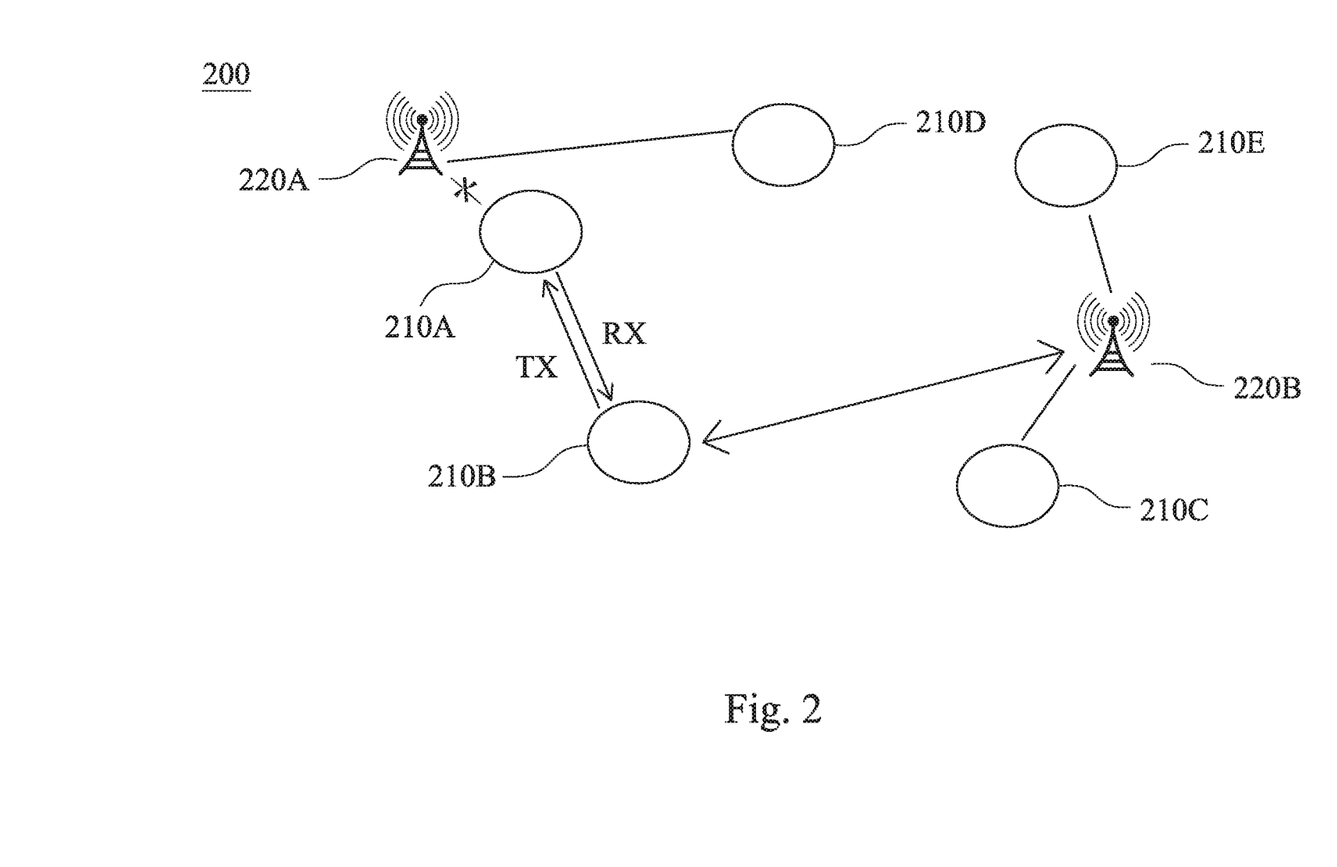
FIG. 2 shows a schematic view of a communication system in an Internet of Things environment according to another embodiment of the present disclosure.

FIG. 1 shows a flow chart of a communication method 100 in an Internet of Things (IoT) environment according to one embodiment of the present disclosure. FIG. 2 shows a schematic view of a communication system 200 in the IoT environment according to another embodiment of the present disclosure. The communication method 100 in the IoT environment is applied on the communication system 200 in the IoT environment. The communication method 100 in the IoT environment is for transmitting an outgoing message of a demand device 210A to an Internet. The communication method 100 in the IoT environment includes a device status acquiring step S12, a switch process determining step S14 and a message transmitting step S16.

There are two schemes in the device status acquiring step S12. One is an automatic condition obtainment scheme, and the other is a passive condition obtainment scheme. The automatic condition obtainment scheme of the device status acquiring step S12 includes obtaining a signal connecting status between the demand device 210A and a first base station 220A. The passive condition obtainment scheme of the device status acquiring step S12 includes obtaining a user demand condition inputted from a user terminal to the demand device 210A. The outgoing message to be transmitted is stored in the demand device 210A.

The switch process determining step S14 includes determining whether a switch process of the demand device 210A is activated according to the signal connecting status or the user demand condition. In response to determining that the switch process of the demand device 210A is activated, the switch process determining step S14 includes establishing a first communication path to connect the demand device 210A, a target device 210B, a second base station 220B, and the Internet. In response to determining that the switch process of the demand device 210A is not activated, the switch process determining step S14 includes establishing a second communication path to connect the demand device 210A, the first base station 220A, and the Internet.

The message transmitting step S16 includes transmitting the outgoing message from the demand device 210A to the Internet via one of the first communication path and the second communication path. Therefore, the communication method 100 in the IoT environment of the present disclosure utilizes the switch process to communicate the demand device 210A with the target device 210B, thereby not only increasing the convenience of Internet connections, but also reducing power consumption without additional hardware cost.

Figure 3:
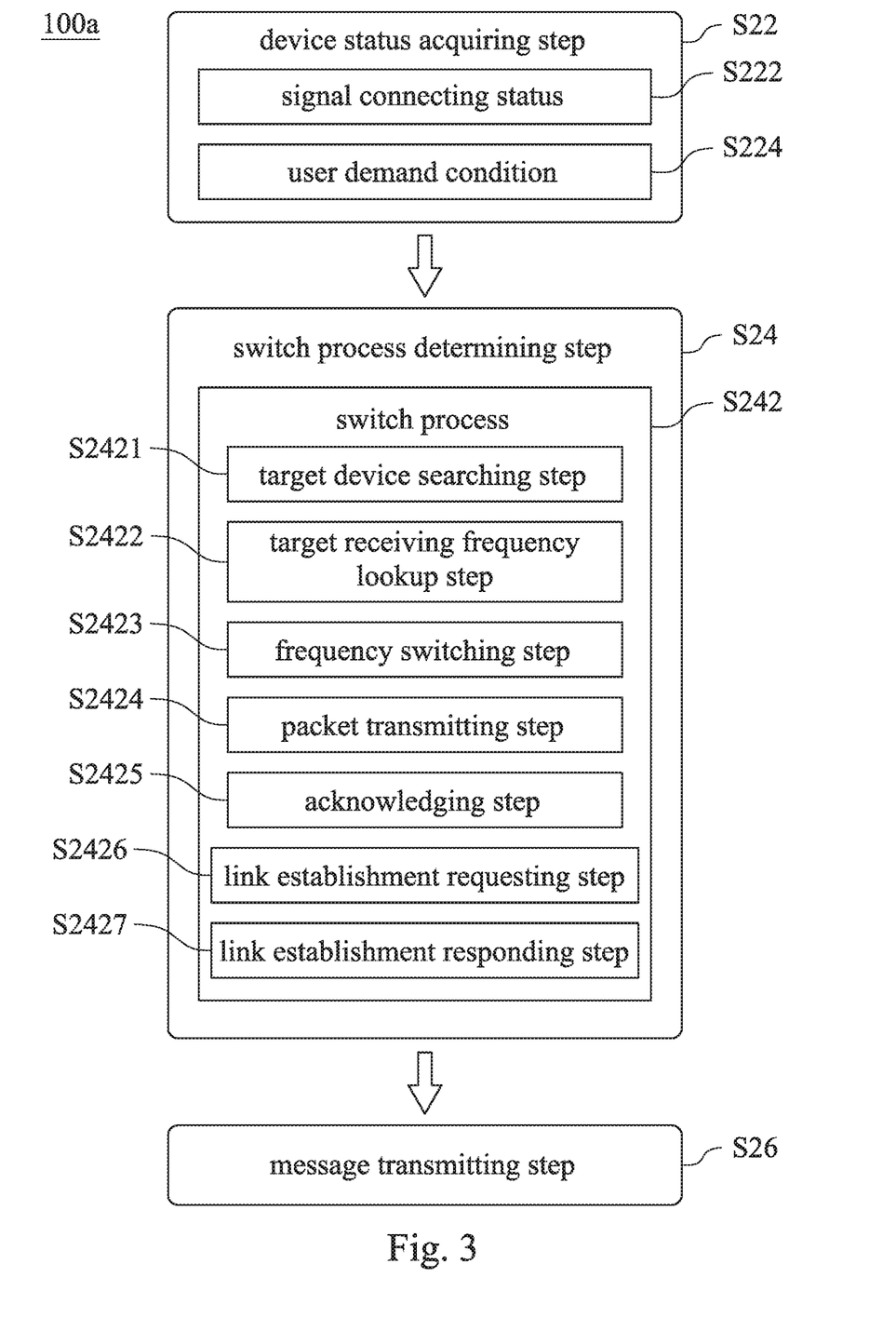
FIG. 3 shows a flow chart of a communication method in an Internet of Things environment according to further another embodiment of the present disclosure.
Figure 4:
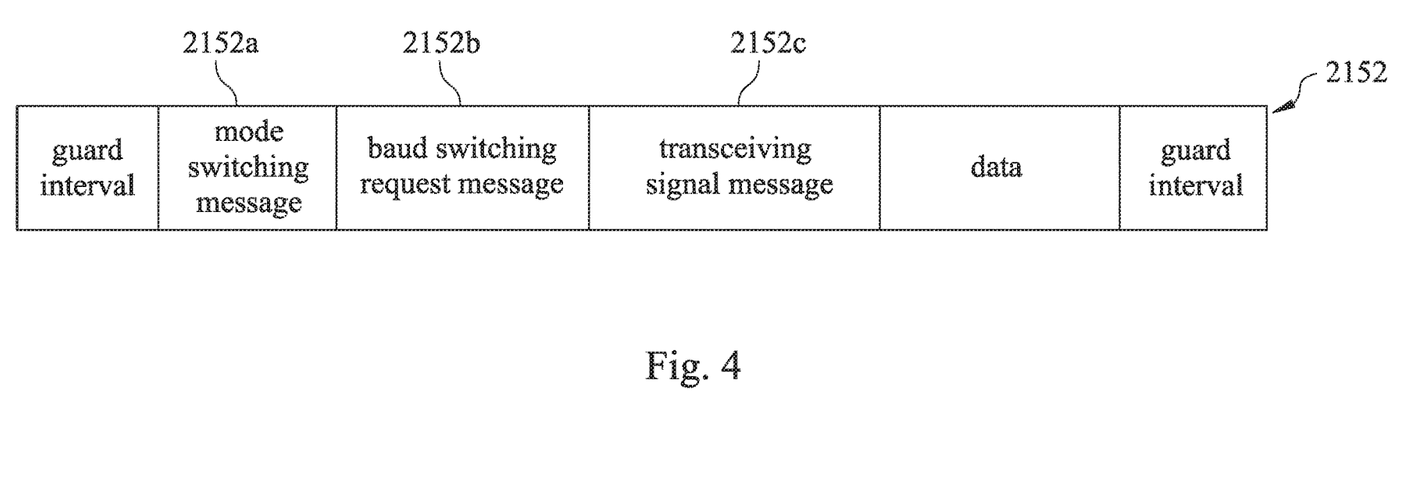
FIG. 4 shows a schematic view of a packet signal of a switch process determining step of FIG. 3.
Figure 5:
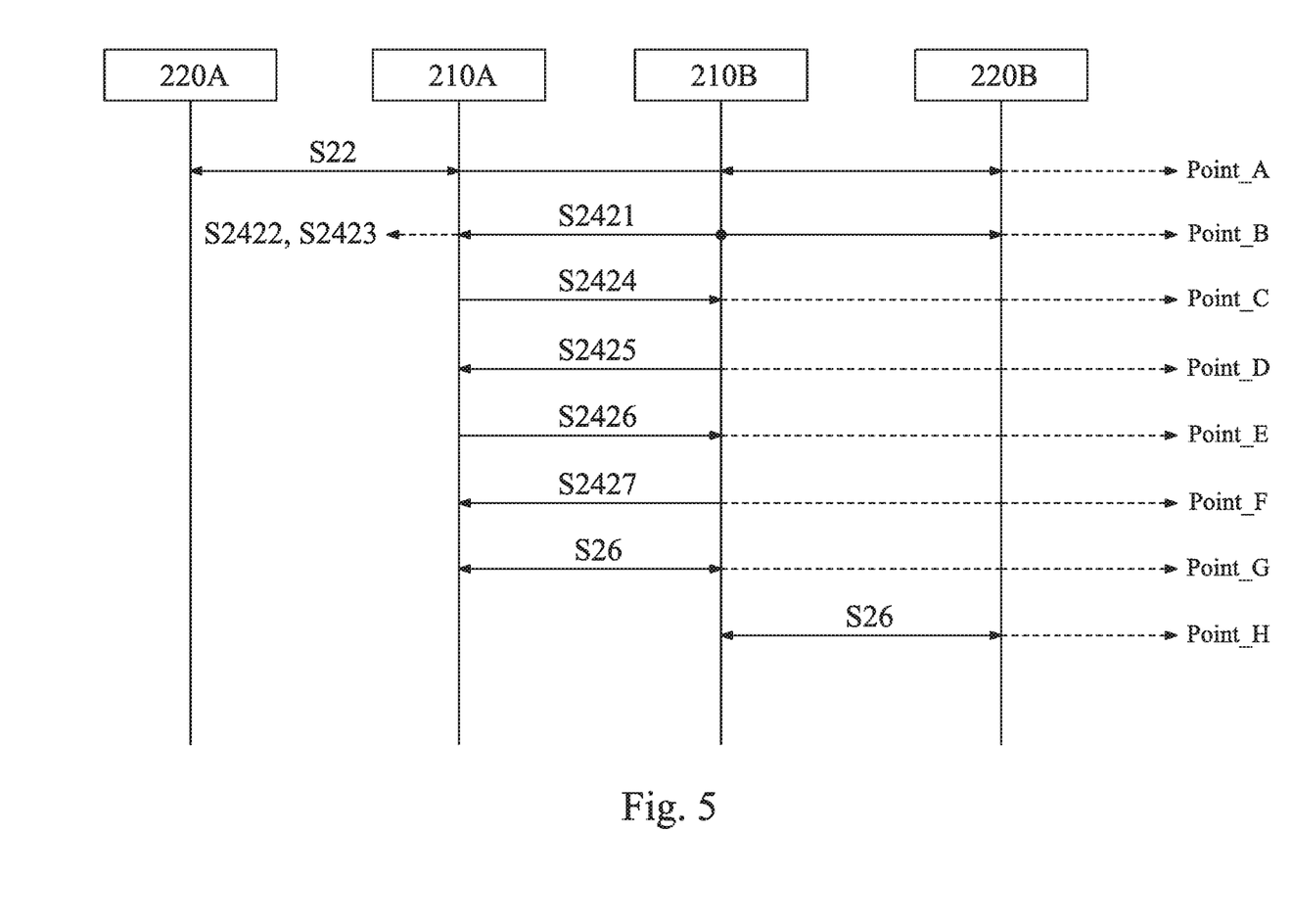
FIG. 5 shows a flow chart of time points of the communication method in the Internet of Things environment of FIG. 3.

FIG. 3 shows a flow chart of a communication method 100a in the IoT environment according to further another embodiment of the present disclosure. FIG. 4 shows a schematic view of a packet signal 2152 of a switch process determining step S24 of FIG. 3. FIG. 5 shows a flow chart of time points of the communication method 100a in the IoT environment of FIG. 3. In FIGS. 1-5, the communication method 100a in the IoT environment is for transmitting an outgoing message to an Internet. The communication method 100 in the IoT environment provides a device status acquiring step S22, a switch process determining step S24 and a message transmitting step S26.

There are two schemes in the device status acquiring step S22. One is an automatic condition obtainment scheme, and the other is a passive condition obtainment scheme. The automatic condition obtainment scheme of the device status acquiring step S22 includes obtaining a signal connecting status S222 between the demand device 210A and a first base station 220A. The passive condition obtainment scheme of the device status acquiring step S22 includes obtaining a user demand condition S224 inputted from a user terminal to the demand device 210A. The outgoing message to be transmitted is stored in the demand device 210A. In detail, in the automatic condition obtainment scheme, the signal connecting status S222 may be divided into "normal connection" and "abnormal connection". A judgment basis for determining whether the condition is normal or not is based on a signal quality indicator and data corresponding to the signal quality indicator. The signal quality indicator includes at least one of a received signal strength indicator (RSSI), a signal-to-interference-plus-noise ratio (SINR), a reference signal received power (RSRP), a block error rate (BLER), a throughput, and a distance between the demand device 210A and the first base station 220A. In response to determining that the data corresponding to the signal quality indicator is greater than or equal to a predetermined value, the signal connecting status S222 is "normal connection". In response to determining that the data corresponding to the signal quality indicator is smaller than the predetermined value, the signal connecting status S222 is "abnormal connection". In addition, in the passive condition obtainment scheme, the user demand condition S224 may be divided into "with demand" and "without demand". "with demand" represents that the demand device 210A receives an input from the user terminal, and "without demand" represents that the demand device 210A does not receive the input from the user terminal.

The switch process determining step S24 includes determining whether a switch process S242 of the demand device 210A is activated according to the signal connecting status S222 or the user demand condition S224. In response to determining that the switch process S242 of the demand device 210A is activated, the switch process determining step S24 includes establishing a first communication path to connect the demand device 210A, a target device 210B, a second base station 220B and the Internet. In response to determining that the switch process S242 of the demand device 210A is not activated, the switch process determining step S24 includes establishing a second communication path to connect the demand device 210A, the first base station 220A, and the Internet. In detail, there are two schemes in the switch process determining step S24. One is an automatic switching scheme corresponding to the automatic condition obtainment scheme of the device status acquiring step S22, and the other is a passive switching scheme corresponding to the passive condition obtainment scheme of the device status acquiring step S22. The automatic switching scheme of the switch process determining step S24 includes determining whether the switch process S242 of the demand device 210A is activated according to the signal connecting status S222. When the signal connecting status S222 of the device status acquiring step S22 is "normal connection", the demand device 210A maintains a connection to the first base station 220A, and the switch process S242 is not activated, i.e., the second communication path is established. When the signal connecting status S222 of the device status acquiring step S22 is "abnormal connection", the switch process S242 of the demand device 210A is activated, and the demand device 210A establishes a connection to the target device 210B, i.e., the first communication path is established, and the connecting status between the target device 210B and the second base station 220B is normal. In addition, the passive switching scheme of the switch process determining step S24 includes determining whether the switch process S242 of the demand device 210A is activated according to the user demand condition S224. When the user demand condition S224 of the device status acquiring step S22 is "without demand", the demand device 210A maintains the connection to the first base station 220A, and the switch process S242 is not activated, i.e., the second communication path is established. When the user demand condition S224 of the device status acquiring step S22 is "with demand", the switch process S242 of the demand device 210A is activated, and the demand device 210A establishes a connection to the target device 210B, i.e., the first communication path is established, and the connecting status between the target device 210B and the second base station 220B is normal.

Furthermore, the switch process S242 of the switch process determining step S24 includes a target device searching step S2421, a target receiving frequency lookup step S2422, a frequency switching step S2423, a packet transmitting step S2424, an acknowledging step S2425, a link establishment requesting step S2426 and a link establishment responding step S2427. The target device searching step S2421 includes initiating the demand device 210A to search the target device 210B within a searchable range of the demand device 210A, thereby obtaining a target transmitting frequency TX of the target device 210B. The target receiving frequency lookup step S2422 includes obtaining a target receiving frequency RX corresponding to the target transmitting frequency TX according to a frequency correspondence table. The target transmitting frequency TX is different from the target receiving frequency RX. In one embodiment, the frequency correspondence table can be obtained according to a 3rd Generation Partnership Project (3GPP) technical specification, but it is not limited thereto. Table 1 lists parameters of the bands 1-4 defined in the 3GPP technical specification. For example, in the band 2 (LTE BAND 2 CHANNEL 18900), the target transmitting frequency TX is 1880 MHz (the range of frequencies is 1850-1910 MHz), and the target receiving frequency RX is 1960 MHz (the range of frequencies is 1930-1990 MHz), so that the target transmitting frequency TX is different from the target receiving frequency RX. "FDD" represents Frequency Division Duplex.

TABLE 1

| Band | TX (MHz) | RX (MHz) | Mode |
| --- | --- | --- | --- |
| 1 | 1920-1980 | 2110-2170 | FDD |
| 2 | 1850-1910 | 1930-1990 | FDD |
| 3 | 1710-1785 | 1805-1880 | FDD |
| 4 | 1710-1755 | 2110-2155 | FDD |

The frequency switching step S2423 includes switching a demand transmitting frequency and a demand receiving frequency of the demand device 210A to the target receiving frequency RX and the target transmitting frequency TX, respectively for communication with the target device. In addition, the packet transmitting step S2424 includes enabling the demand device 210A to transmit a packet signal 2152 at the target receiving frequency RX to the target device 210B. The packet signal 2152 includes two guard intervals, a mode switching message 2152a, a band switching request message 2152b, a transceiving signal message 2152c and data. The mode switching message 2152a indicates that the demand device 210A requests to initiate the switch process S242. The band switching request message 2152b includes information of a frequency band for establishing the connection between the demand device 210A and the target device 210B. The transceiving signal message 2152c includes a signal quality indicator between the demand device 210A and the target device 210B and data corresponding to the signal quality indicator. The signal quality indicator includes at least one of the received signal strength indicator (RSSI), the signal-to-interference-plus-noise ratio (SINR), the reference signal received power (RSRP), the block error rate (BLER), the throughput, and the distance between the demand device 210A and the target device 210B. For example, the guard interval may be represented as "0x00", "0x01", "0x02", "0x03". The mode switching message 2152a may be represented as "0x00", "0x01", "0x02", "0x03". When the mode switching message 2152a is "0x00", the demand device 210A only collects messages of peripheral devices. When the mode switching message 2152a is "0x01", the demand device 210A only collects a state of the target device 2106. When the mode switching message 2152a is "0x02", the switch process of the demand device 210A is activated in a normal mode. If the target device 210B is idle, the target device 210B generates a response and needs to be connected to the demand device 210A for transmitting the data. When the mode switching message 2152a is "0x03", the switch process of the demand device 210A is activated in an emergency mode, and the target device 210B is forced to generate a response and needs to be connected to the demand device 210A for transmitting the data. The band switching request message 2152b may be represented as "0x00000000" to "0xFFFFFFFF". The first two digits of the band switching request message 2152b represent a message of a band. The third digit of the band switching request message 2152b represents a message of a bandwidth. The last five digits of the band switching request message 2152b represent a message of a channel. For example, when the band switching request message 2152b is "0x01304469", it represents that the messages of "band/bandwidth/channel" are "band1/5 MHz/CH18025". The transceiving signal message 2152c may be represented as "0x000000" to "0xFFFFFF".

The first three digits of the transceiving signal message 2152c represent a transmitted signal strength of the target transmitting frequency TX, and the last three digits of the transceiving signal message 2152c represent a received signal strength of the target receiving frequency RX. The first digit of the first three digits represents that the transmitted signal strength is a positive or negative value. The first digit of the last three digits represents that the received signal strength is a positive or negative value. "0" represents the positive value, and "F" represents the negative value. For example, when the transceiving signal message 2152c is "0x017F50", the transmitted signal strength and the received signal strength are 23 dBm and −80 dBm, respectively.

The acknowledging step S2425 includes enabling the target device 210B to determine whether an acknowledgment message (i.e., acknowledgement, ACK) is transmitted to the demand device 210A according to the packet signal 2152. In response to determining that the data corresponding to the signal quality indicator in the transceiving signal message 2152c is greater than or equal to the predetermined value, the acknowledging step S2425 is performed to determine to transmit an acknowledgement message to the demand device 210A. In response to determining that the data corresponding to the signal quality indicator in the transceiving signal message 2152c is smaller than the predetermined value, the acknowledging step S2425 is performed to determine not to transmit an acknowledgement message to the demand device 210A. In addition, the link establishment requesting step S2426 includes driving the demand device 210A to transmit a link establishment requesting signal at the target receiving frequency RX to the target device 210B according to the acknowledgment message. The link establishment responding step S2427 includes driving the target device 210B to respond to the demand device 210A with an acknowledgment packet according to the link establishment requesting signal so as to establish a connection with the demand device 210A.

It is worth mentioning that in the acknowledging step S2425, in response to determining that a plurality of target devices 210B transmit a plurality of acknowledgment messages to the demand device 210A simultaneously, the demand device 210A performs a message selecting mechanism for selecting a best target device to be connected with according to the acknowledgment messages of the target devices 210B, thereby transmitting the outgoing message. The message selecting mechanism includes checking at least one of the received signal strength indicator (RSSI), the signal-to-interference-plus-noise ratio (SINR), the reference signal received power (RSRP), the block error rate (BLER), the throughput, and the distance between the demand device 210A and the target device 210B. Accordingly, the demand device 210A of the present disclosure can select the best one of plural target devices 210B to transmit the outgoing message via the message selecting mechanism, thus effectively accomplishing transmission of the outgoing message and increasing the convenience of Internet connections. The demand device 210A of the present disclosure can avoid a problem of a conventional device that the outgoing message cannot be transmitted if signal quality of the base station is poor.

The message transmitting step S26 includes transmitting the outgoing message from the demand device 210A to the Internet via one of the first communication path and the second communication path. In detail, in response to determining that the switch process S242 of the demand device 210A is activated in the switch process determining step S24, the message transmitting step S26 is for transmitting the outgoing message from the demand device 210A to the Internet via the first communication path. On the contrary, in response to determining that the switch process S242 of the demand device 210A is not activated in the switch process determining step S24, the message transmitting step S26 is for transmitting the outgoing message from the demand device 210A to the Internet via the second communication path. In addition, the outgoing message of the demand device 210A may be one of various types of messages, such as a fire condition, a status message, a synchronization message and so on. The level of the outgoing message can be set by a user. For example, the fire condition may be set to a highest level.

In FIGS. 2, 3 and 5, the device status acquiring step S22 is performed at a first time point Point_A. The target device searching step S2421, the target receiving frequency lookup step S2422 and the frequency switching step S2423 of the switch process determining step S24 is performed at a second time point Point_B. The packet transmitting step S2424 is performed at a third time point Point_C. The acknowledging step S2425 is performed at a fourth time point Point_D. The link establishment requesting step S2426 is performed at a fifth time point Point_E. The link establishment responding step S2427 is performed at a sixth time point Point_F. The message transmitting step S26 is performed at a seventh time point Point_G and an eighth time point Point_H. At the seventh time point Point_G, the target device 210B establishes the connection with the demand device 210A for transmitting the data. At the eighth time point Point_H, the target device 210B establishes the connection with the second base station 220B for transmitting the data. In other words, the target device 210B is not connected to the demand device 210A and the second base station 220B simultaneously, i.e., the target device 210B is only connected to one of the demand device 210A and the second base station 220B at one time point. Therefore, the communication method 100a in the IoT environment of the present disclosure performs the transmitting operation and the receiving operation at different frequencies via a half duplex frequency division duplex (HD-FDD) mode. The HD-FDD mode may be combined with the specific packet signal 2152 of the switch process S242 to select the best one of the target devices 210B for effectively accomplishing transmission of the outgoing message, thereby not only increasing the convenience of Internet connections, but also reducing power consumption without additional hardware cost.

Figure 6:
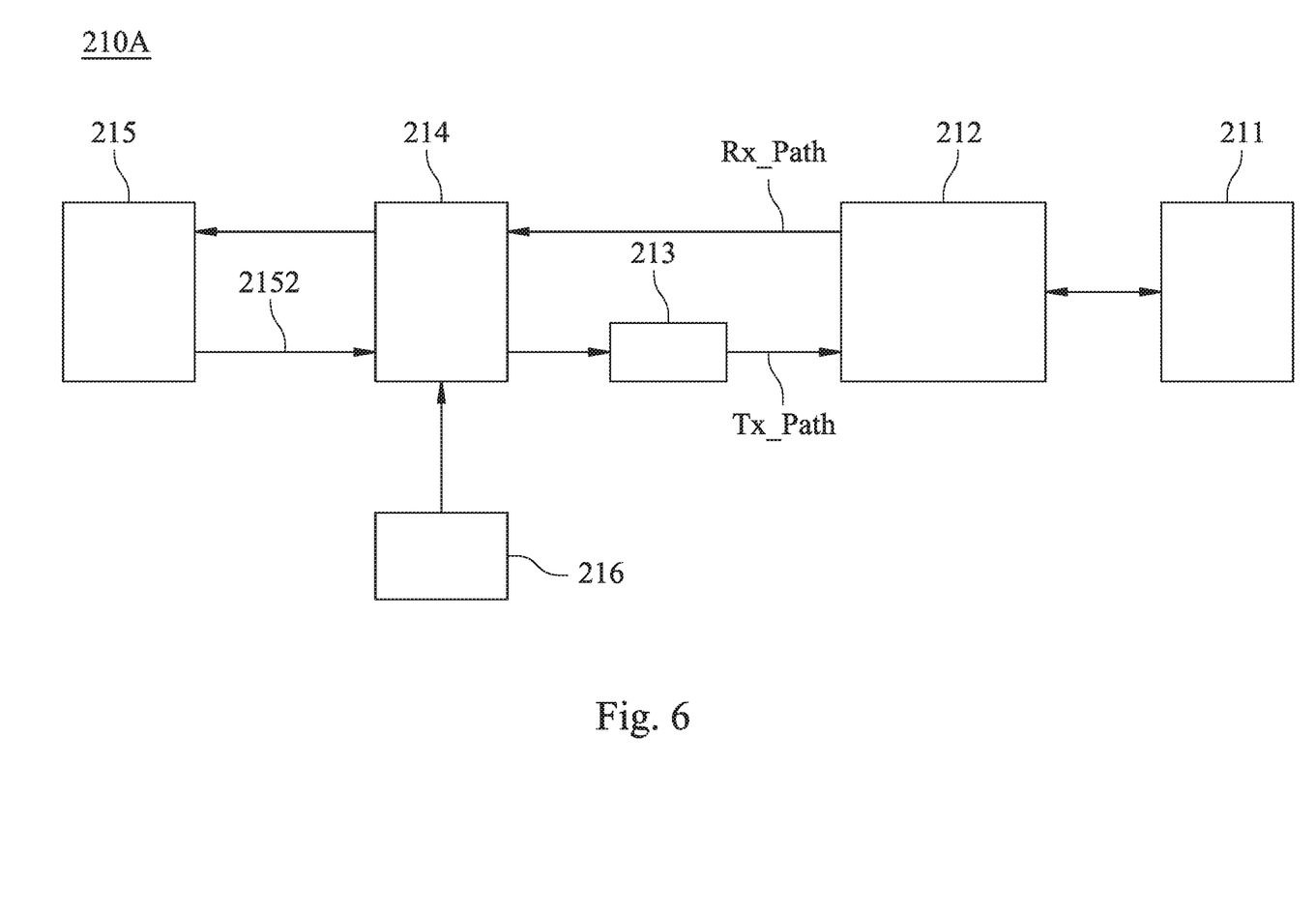
FIG. 6 shows a block diagram of a demand device of the communication system in the Internet of Things environment of FIG. 2.

FIG. 6 shows a block diagram of a demand device 210A of the communication system 200 in the IoT environment of FIG. 2. In FIGS. 2, 3 and 6, the communication system 200 in the IoT environment includes the demand device 210A, a plurality of target devices 210B, 210C, 210D, 210E, a first base station 220A and a second base station 220B. When the demand device 210A wants to connect the Internet via the target device 210B and the second base station 220B, a switch process S242 of the demand device 210A is activated. The demand device 210A is signally connected to the target device 210B. The outgoing message to be transmitted is stored in the demand device 210A. The demand device 210A includes an antenna 211, an antenna switching circuit 212, a power amplifier 213, a mixer 214, a baseband integrated circuit 215 (BBIC) and a control processor 216.

The antenna 211 has an operating band, and the operating band covers a long term evolution (LTE) band. The antenna switching circuit 212 is electrically connected to the antenna 211. The antenna switching circuit 212 can switch a transmitting path Tx_Path and a receiving path Rx_Path. In one embodiment, the antenna switching circuit 212 may be a primary antenna switch SP4T, but it is not limited thereto. The power amplifier 213 is electrically connected to the antenna switching circuit 212 via the transmitting path Tx_Path. The mixer 214 is electrically connected to the power amplifier 213 and electrically connected to the antenna switching circuit 212 via the receiving path Rx_Path. The baseband integrated circuit 215 is electrically connected to the mixer 214 and outputs a packet signal 2152. The packet signal 2152 of the baseband integrated circuit 215 is the same as the packet signal 2152 of the frequency switching step S2423, as shown in FIG. 4. Moreover, the control processor 216 is electrically connected to the antenna switching circuit 212 via the power amplifier 213 and the mixer 214. The control processor 216 is configured to determine whether a switch process S242 of the demand device 210A is activated according to a signal connecting status S222 or a user demand condition S224. In response to determining that the switch process S242 of the demand device 210A is activated, a first communication path is established to connect the demand device 210A, the target device 210B, a second base station 220B and the Internet. The outgoing message of the demand device 210A is transmitted from the demand device 210A to the Internet via the first communication path. In response to determining that the switch process S242 of the demand device 210A is not activated, a second communication path is established to connect the demand device 210A, a first base station 220A and the Internet. The outgoing message of the demand device 210A is transmitted from the demand device 210A to the Internet via the second communication path. When the demand device 210A wants to communicate with the target device 210B, the switch process S242 is activated by the control processor 216. In other words, the control processor 216 performs all of the steps (i.e., the steps S2421-S2427) in the switching process S242 of FIG. 3 so as to establish the first communication path for transmitting the outgoing message. Therefore, the demand device 210A of the present disclosure utilizes the HD-FDD mode combined with the switch process S242 to be capable of adjusting the demand transmitting frequency and the demand receiving frequency of the demand device 210A for communicating with the target device 210B, so that the present disclosure can effectively accomplish transmission of the outgoing message and increase the convenience of Internet connections. The demand device 210A of the present disclosure can avoid a problem of a conventional device that the outgoing message cannot be transmitted if signal quality of the base station is poor. In addition, the communication system 200 in the IoT environment of the present disclosure can be realized by using the existing hardware without additional installation or replacement of hardware so as to have advantages of simple structure and low cost.

In other embodiments, the control processor can be disposed in the mixer, i.e., the control processor can be integrated into the mixer to form a radio frequency integrated circuit (RFIC). The demand device 210A can further include a low pass filter (LPF) group. The LPF group includes a transmitting LPF assembly and a receiving LPF assembly. The transmitting LPF assembly and the receiving LPF assembly are disposed in the transmitting path Tx_Path and the receiving path Rx_Path, respectively, thereby filtering high-frequency noise. In addition, the structures of the demand device 210A and the target devices 210B, 210C, 210D, 210E may be the same as each other. Each of the antennae of the demand device 210A and the target devices 210B, 210C, 210D, 210E has an operating band. The operating band covers the LTE band, but it is not limited thereto.

In summary, the communication methods 100, 100a in the IoT environment and the communication system 200 in the IoT environment of the present disclosure may be applied in following specific application scenarios. In a first example of forest fire prevention, when the demand device 210A detects a fire condition, the demand device 210A can send a message of the fire condition to the first base station 220A on the one hand, and then the outgoing message of the fire condition can be transmitted to a cloud (i.e., the Internet) so as to allow a remote end to know the fire condition. On the other hand, the demand device 210A can rapidly send the outgoing message of the fire condition to the target device 210B (e.g., a detector) around the demand device 210A, so that the target device 210B can get ready for the fire condition or take necessary precautions against fire. In a second example, when the demand device 210A and the target device 210B are both located in a basement, the signal strength of the base station is relatively weak. If the target device 210B is close to a doorway (or a window) and can communicate with the base station, the demand device 210A which needs to send the data can transmit the data to the target device 210B via the switching process S242, and then the data can be transmitted from the target device 210B to the base station. In a third example, when the demand device 210A is used as an electronic fence, the demand device 210A can send the outgoing message to the first base station 220A and the cloud (i.e., the Internet), and detect the target device 210B around the demand device 210A simultaneously. The demand device 210A may be communicated with the target device 210B to avoid omissions. The above three examples are the specific application scenarios of the present disclosure, but it is not limited thereto.

According to the aforementioned embodiments and examples, the advantages of the present disclosure are described as follows.

1. The communication method in the IoT environment of the present disclosure performs the transmitting operation and the receiving operation at different frequencies via the HD-FDD mode. The HD-FDD mode may be combined with the specific packet signal of the switch process to select the best one of the target devices for effectively accomplishing transmission of the outgoing message, thereby not only increasing the convenience of Internet connections, but also reducing power consumption without additional hardware cost.

2. The demand device of the present disclosure can select the best one of plural target devices to transmit the outgoing message via the message selecting mechanism so as to maintain the connection between the demand device and the Internet.

3. The demand device of the present disclosure utilizes the HD-FDD mode combined with the switch process to be capable of adjusting the demand transmitting frequency and the demand receiving frequency of the demand device for communicating with the target device, so that the present disclosure can effectively accomplish transmission of the outgoing message and increase the convenience of Internet connections. The demand device of the present disclosure can avoid a problem of a conventional device that the outgoing message cannot be transmitted if signal quality of the base station is poor. In addition, the communication system in the IoT environment of the present disclosure can be realized by using the existing hardware without additional installation or replacement of hardware so as to have advantages of simple structure and low cost.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication method in an Internet of Things environment for transmitting an outgoing message to an Internet, the communication method comprising:
   performing a device status acquiring step to obtain a signal connecting status between a demand device and a first base station, wherein the outgoing message is stored in the demand device;
   performing a switch process determining step to determine whether a switch process of the demand device is activated according to the signal connecting status;
   in response to determining that the switch process of the demand device is activated, establishing a first communication path to connect the demand device, a target device, a second base station, and the Internet; and
   in response to determining that the switch process of the demand device is not activated, establishing a second communication path to connect the demand device, the first base station, and the Internet; and
   performing a message transmitting step to transmit the outgoing message from the demand device to the Internet via one of the first communication path and the second communication path;
   wherein the switch process comprises:
   performing a target device searching step to initiate the demand device to search the target device within a searchable range of the demand device, thereby obtaining a target transmitting frequency of the target device; and
   performing a target receiving frequency lookup step to obtain a target receiving frequency corresponding to the target transmitting frequency according to a frequency correspondence table, wherein the target transmitting frequency is different from the target receiving frequency.

2. The communication method of claim 1, wherein the switch process further comprises:
   performing a frequency switching step to switch a demand transmitting frequency and a demand receiving frequency of the demand device to the target receiving frequency and the target transmitting frequency, respectively for communication with the target device.

3. The communication method of claim 2, wherein the switch process further comprises:
   performing a packet transmitting step to enable the demand device to transmit a packet signal at the target receiving frequency to the target device; and
   performing an acknowledging step to enable the target device to determine whether an acknowledgement message is transmitted to the demand device according to the packet signal.

4. The communication method of claim 3, wherein the switch process further comprises:
   performing a link establishment requesting step to drive the demand device to transmit a link establishment requesting signal at the target receiving frequency to the target device according to the acknowledgment message; and
   performing a link establishment responding step to drive the target device to respond to the demand device with an acknowledgment packet according to the link establishment requesting signal so as to establish a connection with the demand device.

5. The communication method of claim 3, wherein the packet signal comprises:
   a mode switching message indicating that the demand device requests to initiate the switch process;
   a band switching request message comprising information of a frequency band for establishing the connection between the demand device and the target device; and
   a transceiving signal message comprising a signal quality indicator between the demand device and the target device, and data corresponding to the signal quality indicator, wherein the signal quality indicator comprises at least one of a received signal strength indicator (RSSI), a signal-to-interference-plus-noise ratio (SINR), a reference signal received power (RSRP), a block error rate (BLER), a throughput, and a distance between the demand device and the target device;
   wherein in response to determining that the data corresponding to the signal quality indicator is greater than or equal to a predetermined value, the acknowledging step is performed to determine to transmit the acknowledgment message to the demand device, and in response to determining that the data corresponding to the signal quality indicator is smaller than the predetermined value, the acknowledging step is performed to determine not to transmit the acknowledgment message to the demand device.

6. The communication method of claim 3, wherein in the acknowledging step, in response to determining that a plurality of target devices transmit a plurality of acknowledgment messages to the demand device simultaneously, the demand device performs a message selecting mechanism for selecting a best target device to be connected with according to the acknowledgment messages of the target devices, thereby transmitting the outgoing message.

7. The communication method of claim 6, wherein the message selecting mechanism comprises checking at least one of a received signal strength indicator (RSSI), a signal-to-interference-plus-noise ratio (SINR), a reference signal received power (RSRP), a block error rate (BLER), a throughput, and a distance between the demand device and the target device.

8. A communication method in an Internet of Things environment for transmitting an outgoing message to an Internet, the communication method comprising:
   performing a device status acquiring step to obtain a user demand condition inputted from a user terminal to a demand device, wherein the outgoing message is stored in the demand device;
   performing a switch process determining step to determine whether a switch process of the demand device is activated according to the user demand condition;
   in response to determining that the switch process of the demand device is activated, establishing a first communication path to connect the demand device, a target device, a second base station and the Internet; and
   in response to determining that the switch process of the demand device is not activated, establishing a second communication path to connect the demand device, a first base station and the Internet; and performing a message transmitting step to transmit the outgoing message from the demand device to the Internet via one of the first communication path and the second communication path;

wherein the switch process comprises:

performing a target device searching step to initiate the demand device to search the target device within a searchable range of the demand device, thereby obtaining a target transmitting frequency of the target device; and performing a target receiving frequency lookup step to obtain a target receiving frequency corresponding to the target transmitting frequency according to a frequency correspondence table, wherein the target transmitting frequency is different from the target receiving frequency.

9. The communication method of claim 8, wherein the switch process further comprises:

performing a frequency switching step to switch a demand transmitting frequency and a demand receiving frequency of the demand device to the target receiving frequency and the target transmitting frequency, respectively for communication with the target device.

10. The communication method of claim 9, wherein the switch process further comprises:

performing a packet transmitting step to enable the demand device to transmit a packet signal at the target receiving frequency to the target device; and performing an acknowledging step to enable the target device to determine whether an acknowledgement message is transmitted to the demand device according to the packet signal.

11. The communication method of claim 10, wherein the switch process further comprises:

performing a link establishment requesting step to drive the demand device to transmit a link establishment requesting signal at the target receiving frequency to the target device according to the acknowledgment message; and performing a link establishment responding step to drive the target device to respond to the demand device with an acknowledgment packet according to the link establishment requesting signal so as to establish a connection with the demand device.

12. The communication method of claim 10, wherein the packet signal comprises:

a mode switching message indicating that the demand device requests to initiate the switch process;

a band switching request message comprising information of a frequency band for establishing the connection between the demand device and the target device; and a transceiving signal message comprising a signal quality indicator between the demand device and the target device, and data corresponding to the signal quality indicator, wherein the signal quality indicator comprises at least one of a received signal strength indicator (RSSI), a signal-to-interference-plus-noise ratio (SINR), a reference signal received power (RSRP), a block error rate (BLER), a throughput, and a distance between the demand device and the target device;

wherein in response to determining that the data corresponding to the signal quality indicator is greater than or equal to a predetermined value, the acknowledging step is performed to determine to transmit the acknowledgment message to the demand device, and in response to determining that the data corresponding to the signal quality indicator is smaller than the predetermined value, the acknowledging step is performed to determine not to transmit the acknowledgment message to the demand device.

13. The communication method of claim 10, wherein in the acknowledging step, in response to determining that a plurality of target devices transmit a plurality of acknowledgment messages to the demand device simultaneously, the demand device performs a message selecting mechanism for selecting a best target device to be connected with according to the acknowledgment messages of the target devices, thereby transmitting the outgoing message.

14. The communication method of claim 13, wherein the message selecting mechanism comprises checking at least one of a received signal strength indicator (RSSI), a signal-to-interference-plus-noise ratio (SINR), a reference signal received power (RSRP), a block error rate (BLER), a throughput, and a distance between the demand device and the target device.

15. A communication system in an Internet of Things environment, which is configured to transmit an outgoing message to an Internet, the communication system comprising:

a target device; and a demand device signally connected to the target device, wherein the outgoing message is stored in the demand device, and the demand device comprises:

an antenna;

an antenna switching circuit electrically connected to the antenna; and a control processor electrically connected to the antenna switching circuit, wherein the control processor is configured to determine whether a switch process of the demand device is activated according to a signal connecting status or a user demand condition;

in response to determining that the switch process of the demand device is activated, a first communication path is established to connect the demand device, the target device, a second base station, and the Internet; and in response to determining that the switch process of the demand device is not activated, a second communication path is established to connect the demand device, a first base station, and the Internet;

wherein the outgoing message is transmitted from the demand device to the Internet via one of the first communication path and the second communication path, the switch process initiates the demand device to search the target device within a searchable range of the demand device to scan a target transmitting frequency of the target device, the switch process configures the demand device to obtain a target receiving frequency corresponding to the target transmitting frequency by referencing with a frequency correspondence table, and the target transmitting frequency is different from the target receiving frequency.

16. The communication system of claim 15, wherein the switch process switches a demand transmitting frequency and a demand receiving frequency of the demand device to the target receiving frequency and the target transmitting frequency, respectively for communication with the target device, and the demand device transmits a packet signal at the target receiving frequency to the target device, and the target device transmits an acknowledgment message to the demand device according to the packet signal.

17. The communication system of claim 15, wherein the antenna has an operating band, and the operating band covers a long term evolution (LTE) band.

* * * * *